United States Patent
Miller et al.

(10) Patent No.: US 12,073,111 B2
(45) Date of Patent: Aug. 27, 2024

(54) DOMAIN-SELECTIVE CONTROL COMPONENT

(71) Applicant: Rambus Inc., San Jose, CA (US)

(72) Inventors: Michael Raymond Miller, Raleigh, NC (US); Dongyun Lee, Sunnyvale, CA (US)

(73) Assignee: Rambus Inc., San Jose, CA (US)

( * ) Notice: Subject to any disclaimer, the term of this patent is extended or adjusted under 35 U.S.C. 154(b) by 70 days.

(21) Appl. No.: 17/940,956

(22) Filed: Sep. 8, 2022

(65) Prior Publication Data
US 2023/0087576 A1   Mar. 23, 2023

Related U.S. Application Data

(60) Provisional application No. 63/246,248, filed on Sep. 20, 2021.

(51) Int. Cl.
G06F 3/06  (2006.01)

(52) U.S. Cl.
CPC .......... *G06F 3/0655* (2013.01); *G06F 3/0604* (2013.01); *G06F 3/0673* (2013.01)

(58) Field of Classification Search
CPC ..... G06F 3/0655; G06F 3/0604; G06F 3/0673
See application file for complete search history.

(56) References Cited

U.S. PATENT DOCUMENTS

| | | | |
|---|---|---|---|
| 6,553,503 B1 | 4/2003 | Li | |
| 2009/0193285 A1* | 7/2009 | Lutscher | G06F 13/4059 713/600 |
| 2023/0035110 A1* | 2/2023 | Dahle | G06F 5/08 |

OTHER PUBLICATIONS

Apperson, Ryan W., et al., "A Scalable Dual-Clock FIFO for Data Transfers Between Arbitrary and Haltable Clock Domains", IEEE Transactions on Very Large Scale Integration (VLSI) Systems, vol. 15, No. 10, Oct. 2007, pp. 1125-1134. 10 pages.

Cummings, Clifford E., "Simulation and Synthesis Techniques for Asynchronous FIFO Design", Sunburst Design, SNUG San Jose 2002, Rev. 1.2, Downloaded on Sep. 7, 2022 at: http://www.sunburst-design.com/papers/CummingsSNUG2002SJ_FIFO1.pdf. 23 pages.

* cited by examiner

*Primary Examiner* — Edward J Dudek, Jr.
(74) *Attorney, Agent, or Firm* — Charles Shemwell

(57) ABSTRACT

A control component implements pipelined data processing operations in either of two timing domains bridged by a domain-crossing circuit according to one or more configuration signals that indicate relative clock frequencies of the two domain and/or otherwise indicate which of the two timing domains will complete the data processing operations with lowest latency.

22 Claims, 4 Drawing Sheets

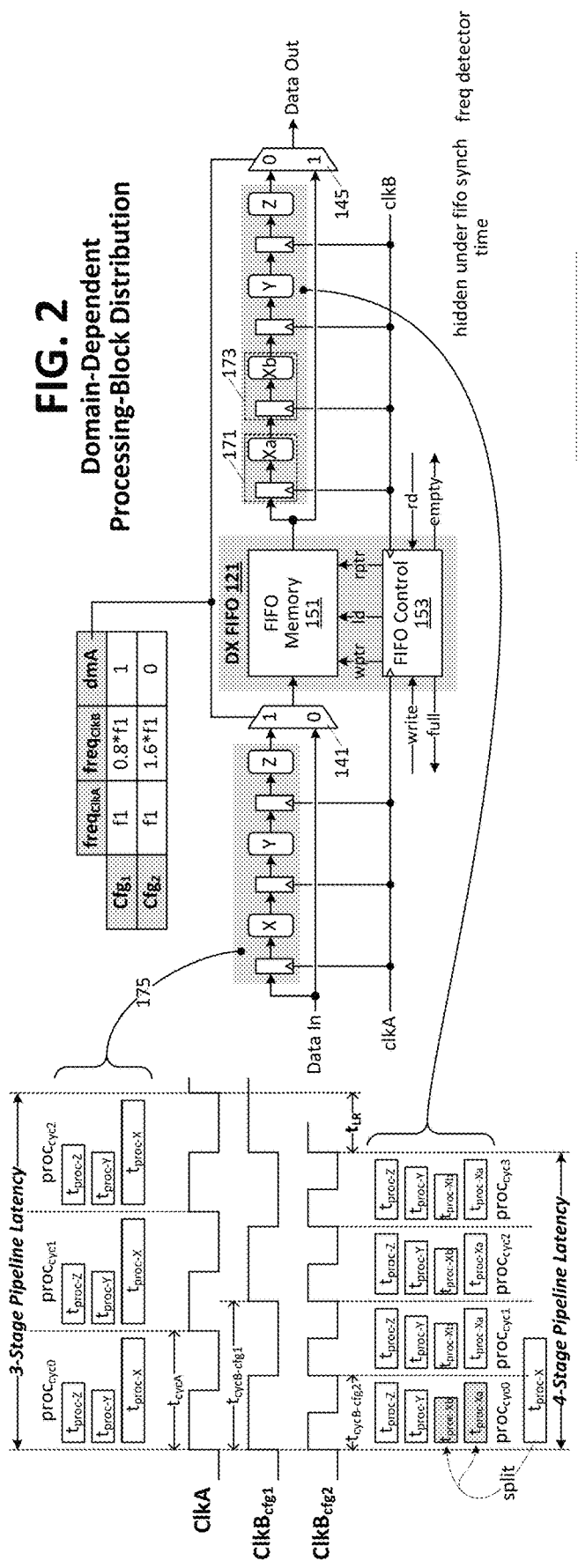
FIG. 2 Domain-Dependent Processing-Block Distribution
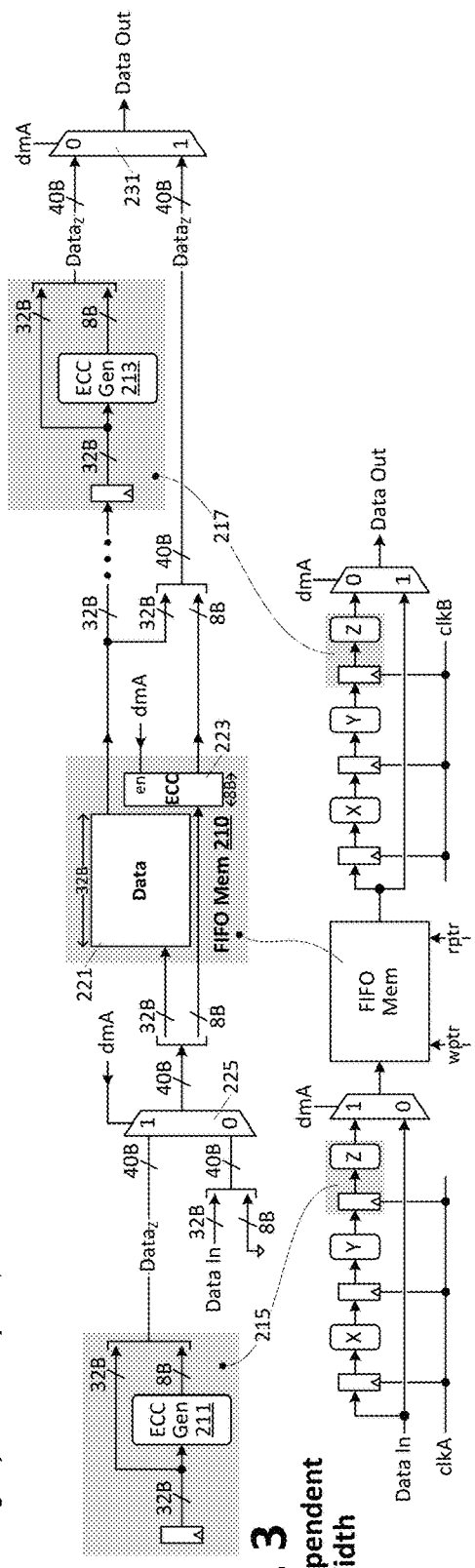
FIG. 3 Domain-Dependent FIFO Width Auto-Selected Processing-Domain Domain-Multiplexed Pipeline Placement

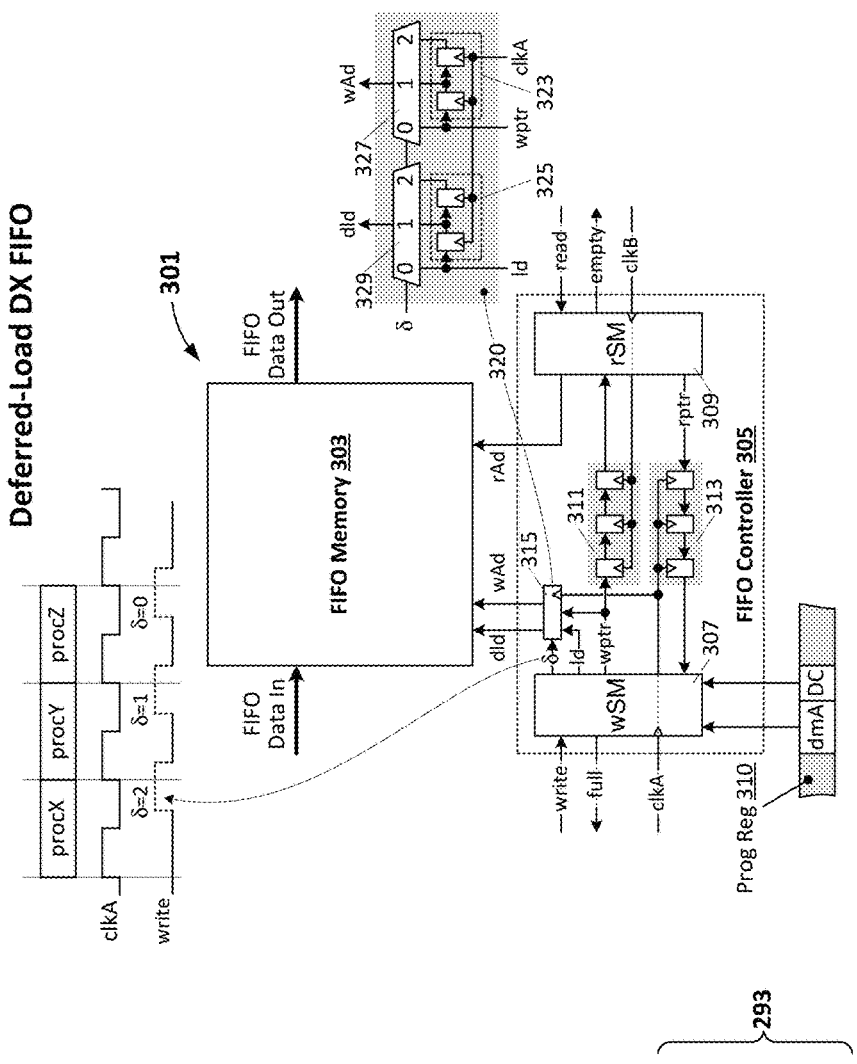
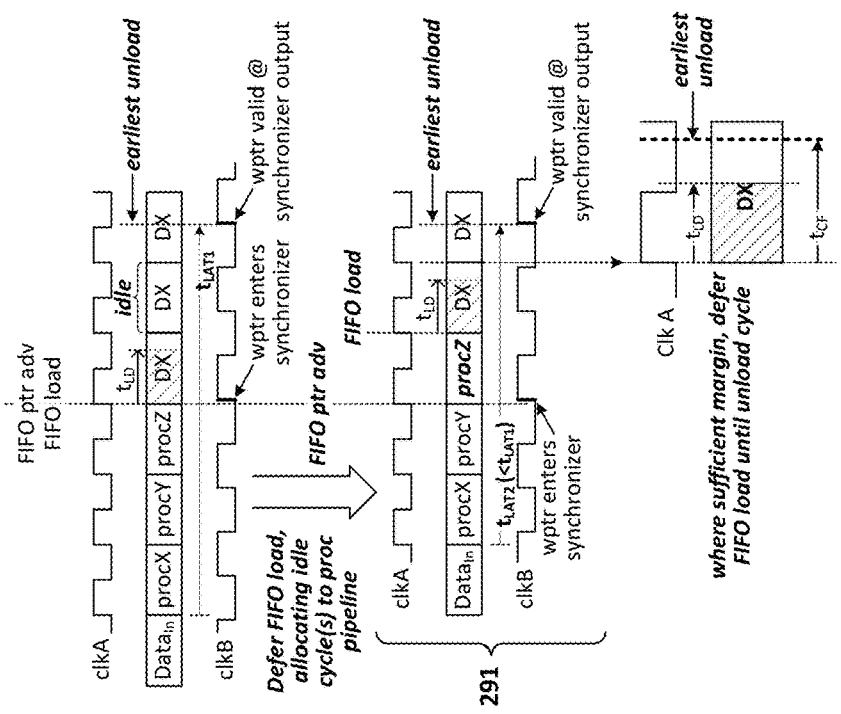

DOMAIN-SELECTIVE CONTROL COMPONENT

CROSS REFERENCE TO RELATED APPLICATIONS

This application hereby incorporates by reference and claims the filing-date benefit of U.S. Provisional Application No. 63/246,248 filed Sep. 20, 2021.

TECHNICAL FIELD

The disclosure herein relates to low-latency data storage and retrieval.

DRAWINGS

The various embodiments disclosed herein are illustrated by way of example, and not by way of limitation, in the figures of the accompanying drawings and in which like reference numerals refer to similar elements and in which:

FIG. 2 illustrates an example of asymmetric, but otherwise functionally equivalent pipeline implementations the host-side and memory-side timing domains;

FIG. 3 illustrates an embodiment of a domain-crossing first-in-first-out (FIFO) memory having a domain-dependent data width;

Figure 1:
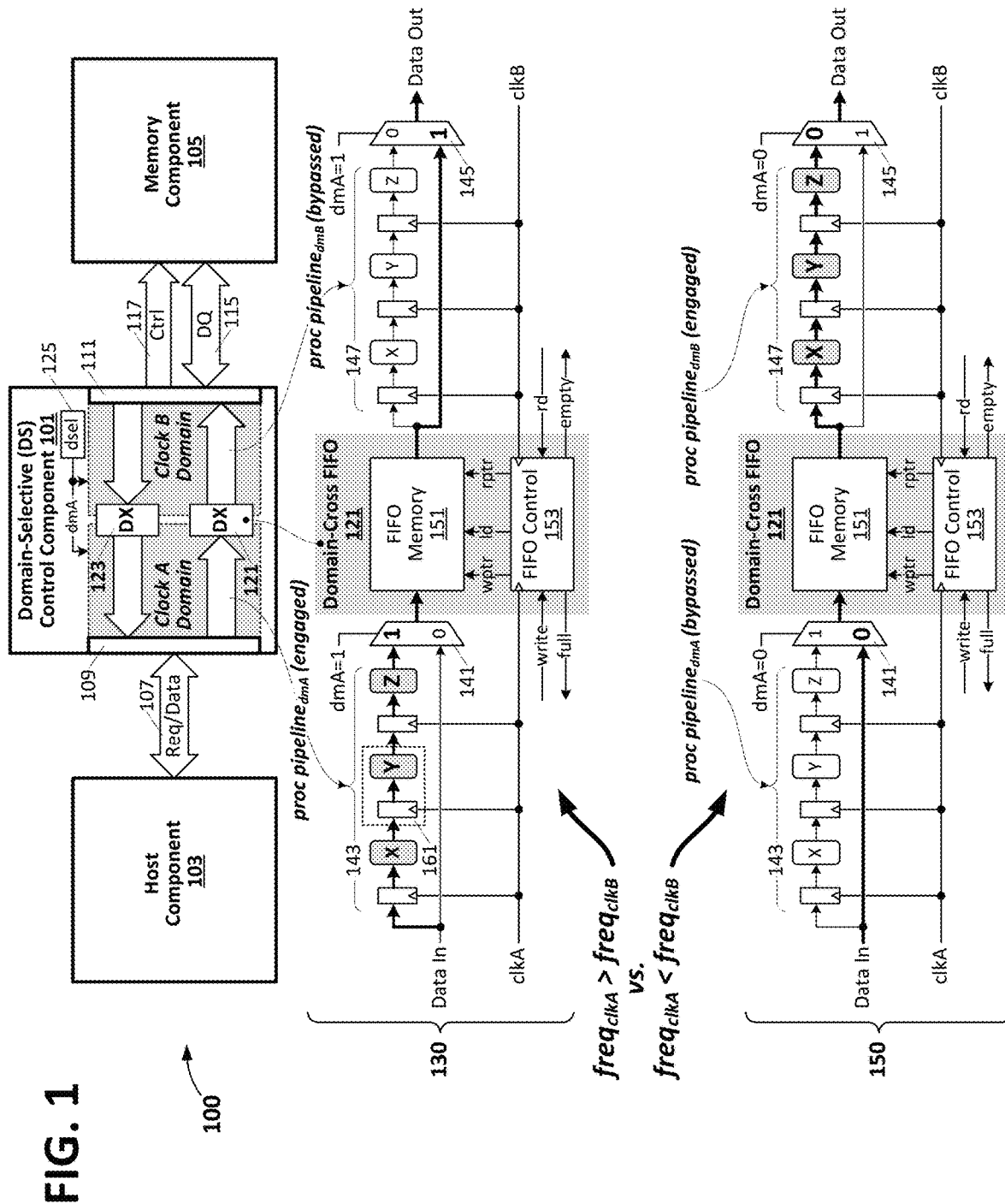
FIG. 1 illustrates a data processing system having a domain-selective control component disposed between a host component and a memory component.
Figure 5:
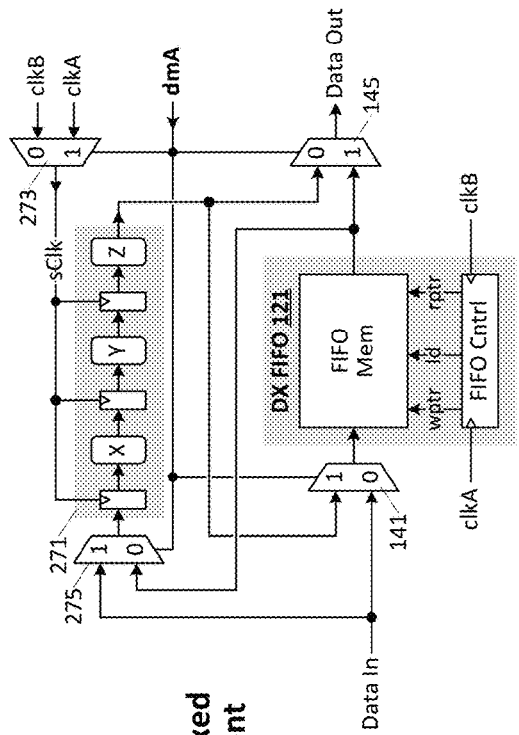

FIG. 5, for example, illustrates an alternative implementation of the domain-selective processing pipelines of FIG. 1;

FIG. 6 illustrates exemplary hidden-cycle processing in which one or more processing operations within a processing pipeline are executed concurrently with and thus effectively hidden under pointer synchronization time within a domain-crossing FIFO; and FIG. 7 illustrates an embodiment of a deferred-load domain-cross FIFO that enables the hidden-cycle processing shown in FIG. 6.

DETAILED DESCRIPTION

In various embodiments herein, a control component implements pipelined data processing operations in either of two timing domains bridged by a domain-crossing circuit according to one or more configuration signals that indicate relative clock frequencies of the two domain and/or otherwise indicate which of the two timing domains will complete the data processing operations with lowest latency. In a number of embodiments the control component is coupled between a host component and a memory component, having host-side and memory-side physical interfaces (PHYs) that establish, within the memory control component, corresponding host-side and memory-side timing domains with disparate operating frequencies. Moreover, as each of those PHYs—and the memory-side PHY in particular—are configurable to operate with counterpart components operating at a variety/range of different frequencies, the relative frequency relationships between the host-side and memory-side domains may vary from installation to installation. By selectively implementing pipelined multi-stage data processing operations (i.e., data inbound via the host-side PHY propagating through processing pipeline prior to outbound transmission via memory-side PHY and vice-versa) within one of the two timing domains in response to domain-select configuration signals (i.e., indicative of the lowest-latency domain selection), pipeline traversal time and thus end-to-end data latency through the control component may be reduced, thus optimizing control component performance for a given installation and/or system configuration.

FIG. 1 illustrates a data processing system 100 having a domain-selective control component 101 ("DS Controller") disposed between a host component 103 and memory component 105. The host component (e.g., CPU or other processing component) issues data read and write requests via signaling channel 107 to host-side PHY 109 of control component 101, for example, according to a proprietary or industry-standard communication protocol/interface that supports memory read and write semantics (e.g., Compute Express Link (CXL) operating over PCI Express physical-layer interface, GenZ, Coherent Accelerator Processor Interface (CAPI), OpenCAPI, etc.). In the case of data write requests (write data and write request inbound via host-side PHY 109), control component 101 executes various pipelined operations with respect to the inbound write data—error correction code (ECC) generation, integrity and data encryption (IDE), MAC-layer integrity, data freshness processing, data compression, etc.—before transmitting the data via memory-side PHY 111 to memory component 105. Conceptually at least, those "data processing" operations may be viewed as a sequence of combinatorial logic operations executed in sequential cycles of a clock and thus in sequential stages of a data processing pipeline—a relatively lengthy pipeline in some cases, having for example 50 or more pipestages and thus imposing 50 or more clock cycles of latency for end-to-end traversal. Read data arriving via memory-side PHY 111 (i.e., via bidirectional data path 115 in response to host read requests forwarded to memory component 105 by control component 101 via control path 117) likewise traverses a potentially lengthy processing pipeline (e.g., decompression, ECC-effected error detection/correction, decryption, etc.) before being transmitted to host component 103 via PHY 109, adding directly to host-perceived read latency.

In various configurations and/or operating modes of system 100, the host-side and memory-side PHYs within control component 101 generate (or receive or synthesize) respective host-side and memory-side clock signals that cycle at different frequencies, establishing correspondingly disparate host-side and memory-side timing domains within the control component—"clock A" and "clock B" timing domains bridged in each data flow direction (i.e., data crossing from one clock domain to the other) by a respective domain-crossing (DX) first-in-first-out data buffer (FIFO) 121, 123. In a number of implementations, the host-side clock signal is synthesized (e.g., via clock-data-recovery) or received from host component 103 with or without frequency multiplication and thus cycles at a frequency somewhat fixed according to the host-to-controller communication protocol. By contrast, the memory-side interface may generate (or receive) clock signals at a variety of frequencies to accommodate different memory component types and capabilities (e.g., according to different JEDEC memory standards such as DDR2, DDR3, DDR4, DDR5, low-power versions thereof, etc.), some below and some above the host-side clock frequency. Accordingly, in different controller configurations/deployments, write data may cross through DX FIFO 121 from a lower frequency domain to a higher frequency domain, or vice-versa (conversely so for read data crossing through DX FIFO 123), with various frequency ratios between the two domains. Moreover, in some embodiments, the clock frequency in either domain may transition during system run time (e.g., dynamically scaled up/down upon exit from/entry into one or more low power modes), so that the polarity of any inequality between the host-side and memory-side domains may flip during controller operation—the slower domain becoming the faster and vice-versa.

Still referring to FIG. 1, control component includes circuitry to implement all or any portion of the data processing pipeline selectively within either of the A or B clock domains according to which of those domains will yield the shortest pipeline transit time and thus the lowest end-to-end propagation latency between the host-side and memory-side control interfaces. In a number of embodiments, a domain-select circuit 125 (e.g., implemented by a host-programmable register and/or frequency-comparator circuit) outputs a domain-select signal (dmA, referring to domain A) that engages the read and write data processing pipelines (or any portion thereof) within the lower-latency one of the two clock domains and bypasses circuitry forming counterpart processing pipelines within the other, higher-latency one of the two clock domains. In a general case, the higher frequency clock domain will yield the lowest latency processing pipeline (i.e., as data progresses between successive stages of the pipeline in respective clock cycles so that a higher frequency clock yields a correspondingly shortened pipestage interval and thus a net propagation time shorted by the ratio of the shorter clock period to the longer clock period multiplied by the number of pipeline stages), with the domain selector raising or lowering the domain-select signal (dmA) accordingly to engage the processing pipeline in the faster (higher frequency clock) domain and bypass the processing pipeline in the slower (lower frequency clock) domain. In the FIG. 1 example shown at 130, for instance, where the frequency of the host-side clock (clkA) exceeds the memory-side clock frequency (clock B or clkB), the domain-select circuit raises dmA (i.e., dmA=1) to select, via multiplexer 141, the output of a multi-stage processing pipeline 143 clocked by clkA (i.e., the host-side clock) as the input to domain-crossing FIFO 121 and thus engage the domain-A processing pipeline. Multiplexer 145 performs the converse operation in the destination timing domain (clock B domain), passing the output of the domain-crossing FIFO directly to a data output and bypassing a processing pipeline instance 147 implemented in the clock B timing domain. When the polarity of the clock inequality is reversed (frequency of clock B exceeds frequency of clock A as shown in the example at 150), domain-select circuit 125 outputs dmA in the inverse state (dmA=0 in this example), reversing the selections within the engage/bypass multiplexers 141, 145 so that the domain-A processing pipeline 143 is bypassed and domain-B processing pipeline 147 is engaged.

In the FIG. 1 examples at 130 and 150, the processing pipelines are illustrated conceptually as a sequence of flop stages (flip-flops clocked by respective domain clocks, clkA, clkB) and corresponding combinatorial logic blocks, with the data output from a given flop being "processed" within the combinatorial logic block for that stage (e.g., subject to logical operation yielding modified and/or additionally derived data output) to yield the data clocked into the subsequent flop stage during the ensuing clock cycle. Accordingly, referring to the write data path shown, a sequence of 32-byte (32B) write data values inbound from the host (together with associated write requests and write-address values) may propagate through the processing pipeline concurrently, with each write data value resident within a respective pipestage during a given clock cycle and thus all data values marching through the pipeline in sequence. While a three-stage processing pipeline having 'X', 'Y' and 'Z' pipestages (each pipestage implemented by a flop and combinatorial logic block as shown at 161 and referred to herein according to the 'X', 'Y' or 'Z' designation of the constituent combinatorial logic block) is shown in the FIG. 1 examples at 130 and 150 and carried forward in various embodiments discussed below, in all cases the processing pipeline depth may extend to tens or hundreds or more pipestages—Accordingly, as the end-to-end pipeline latency is a product of the number of stages multiplied by the domain clock period, selective pipeline engagement in the faster domain yields appreciable latency reduction—shaving off 5, 10 or more processing clock cycles in some implementations. Additionally, while described as a processing operation, the individual operations performed within a given pipestage (e.g., X, Y or Z) may merely be one segment of a more comprehensive data processing/computational operation (e.g., ECC generation, data encryption, etc.) with each such comprehensive processing operation implemented by any number of successive pipestages within the overall data processing pipeline. Further, the data processing pipelines shown at 143 and 147 in the host-side and memory-side clock domains may not constitute the complete data processing pipeline within DS controller 101. For example, while the illustrative X, Y, Z processing pipeline is dynamically/selectively relocatable (engaged) within the A and B clock domains, in all embodiments herein one or more other processing operations may be fixed within one timing domain or the other (e.g., to leverage signals or information available and/or meaningful exclusively within a given timing domain, where outputs of a given processing operation are required/applied exclusively within a given timing domain, etc.).

In the FIG. 1 embodiment, domain-crossing FIFO 121 is implemented by a FIFO memory 151 and FIFO controller 153 (likewise for DX FIFO 123), the latter triggering FIFO memory load and unload operations in response to incoming FIFO write and read control signals ("write," "read"). More specifically, FIFO controller 153 responds to write signal assertion by asserting a load signal ("ld") to write incoming data (i.e., arriving via multiplexer 141) into a FIFO memory location specified by a write pointer ("wptr"), advancing the write pointer to point to the next-to-be loaded memory location (e.g., modulo incrementing the pointer to effect a ring buffer) and inserting the updated write pointer into a synchronizer circuit (not specifically shown in FIG. 1) for propagation to the FIFO-unload clock domain (the memory-side clock domain or clock B domain in the data-write path shown). FIFO controller 153 executes complementary operations in response to read signal assertion—reading data out of the FIFO storage location specified by a read pointer ("rptr"), advancing the read pointer, and inserting the read pointer into a reverse-direction synchronizer for propagation to the FIFO-load domain. Pointer comparators within the load and unload clock domains (i.e., within FIFO controller 153) compare the write pointer with the load-domain synchronized read pointer and the read pointer with the unload-domain write pointer, respectively, to ascertain FIFO full and empty status, asserting corresponding full/empty signals to stall further FIFO load (if FIFO memory is full) or FIFO unload (if FIFO memory is empty). As discussed in further detail below, depending on the relative frequencies of the load and unload clock domains and the pointer-synchronizer depth (e.g., number of synchronizer stages traversed by write or read pointer before reaching the destination timing domain), data written into the FIFO may be idle for a deterministic number of cycles of the load or unload clock domains. In those scenarios (e.g., indicated by relative clock-ratio information programmed within a configuration register of the DS controller and/or detected by frequency comparison circuitry within the DS controller), the FIFO controller may insert the write pointer into the synchronizer in response to FIFO-write signal assertion, but defer data loading into the FIFO until the idle cycles have transpired, enabling execution of a corresponding number of pipestage operations within the processing pipeline—effectively reducing FIFO transit latency and thus end-to-end propagation latency between the host-side and memory-side PHYs.

FIG. 2 illustrates an example of asymmetric, but otherwise functionally equivalent pipeline implementations the host-side and memory-side timing domains. In the depicted example, the host-side clock frequency is fixed at f1 (e.g., 1 GHz), whereas the memory-side clock frequency may be either 800 MHz or 1.6 GHz, depending on memory installation. Where the slower 800 MHz memory is installed, the domain-select signal is raised to engage an exemplary processing pipeline within the faster host-side clock domain (i.e., pipeline conceptually implemented by X, Y and Z pipestages whereas a deployed implementation may include fifty or more pipestages as discussed above) and to bypass the equivalent processing pipeline within the memory-side domain. As each of the X, Y and Z processing operations has a respective asynchronous execution time—e.g., respective time periods ($t_{proc-X}$, $t_{proc-Y}$, $t_{proc-Z}$) required for signals to propagate end-to-end through combinatorial logic gates and/or other circuitry—less than the marginal clkA cycle time in each instance (i.e., the marginal cycle time being the clock period less a predetermined tolerance and worst-case flop-stage setup/hold time). Accordingly, each of the X, Y and Z processing operations may be completed within a respective pipestage of the pipeline, thus yielding a three-stage processing pipeline and thus a processing latency equal to the pipeline depth (3) times the clock A period ($t_{clkA}$).

In an alternate configuration where the memory clock frequency doubles to 1.6 GHz, the lengthiest of the process execution times, $t_{proc-X}$, exceeds the clock period of the faster domain, preventing symmetric pipeline implementation on the host- and memory-sides of the domain-cross FIFO. In the FIG. 2 embodiment, the 'X' processing operation is split at a manageable boundary (e.g., point at which a compete set of output signals may be transferred to a subsequent pipestage) into two component processing operations, Xa and Xb each of which fit within the marginal clkB cycle time and thus may be executed in two successive pipeline stages 171, 173 to match the result effected in the single host-side pipeline stage. In this example, the additional pipeline stage (resulting from splitting a single host-side pipestage into two memory-side pipestages) extends the total pipeline depth to four stages which, by virtue of the 60% higher clock B frequency, is nonetheless traversed with less latency (tLR) than the functionally-equivalent 3-stage host-side processing pipeline. In other cases, particularly where a relatively large number of single-stage processing operations require decomposition into multi-stage operations and the frequency disparity between the two clock domains is relatively small, it may occur that engaging the lower-depth pipeline in the lower frequency clock domain (bypassing the higher-depth pipeline in the higher frequency domain) reduces pipeline latency despite the slower clock speed. In those cases, a frequency-driven domain selection (e.g., frequency-compare circuitry outputting a signal specifying processing pipeline engagement in the higher frequency domain) may be overwritten by register programming or configuration control information supplied from the host component.

Still referring to FIG. 2, redistribution of component processing operations between pipestages is not limited to pipestage bifurcation. For example, multiple fragments of an overly long processing operation (i.e., exceeding cycle time of the relevant domain clock) may be distributed among multiple pre-existing pipestages (i.e., having available headroom)—in effect loading each pipestage up to the marginal timing constraint to minimize the number of additional pipestages required relative to equivalent pipeline implementation in a slower clock domain. As a more specific example, instead of splitting process X into Xa and Xb sub-processes to be implemented in successive pipestages (increasing the net pipeline depth as discussed above), a fragment of process X may be implemented (prepended) within the Y pipestage (headroom permitting—possibly shifting a fragment of process Y into the Z pipestage to accommodate a larger fragment of process X within the Y pipestage), potentially obviating the additional pipestage.

In other embodiments, multiple different processing pipeline implementations may be selectable within a given domain (e.g., each functionally equivalent but with different numbers of pipestages and different processing operation compositions) according to the range of supported host-side and/or memory-side clock frequencies—for example, where multiple different memory-side clock rates exceed the host-side clock rate. In those cases, additional selection ports may be provided within multiplexer 145 (or multiplexer 141 in the case of ranged host-side clock frequencies) to select from among the different pipestage arrangements according to the programmed or determined clock frequencies. As an example, where a 3.2 GHz memory installation is supported (in addition to the 800 MHz and 1.6 GHz options shown in FIG. 4) and further requires splitting of all processing operations within the memory-side pipeline shown at 175—process X distributed among four pipestages and processes Y and Z split into two pipestages each, for instance—the resulting 8-stage pipeline may be fed by the output of DX FIFO 121 and supplied to an additional port of output multiplexer 145 (e.g., selectable by a multi-bit domain-select signal). In other embodiments, one or more of the pipestages within one processing pipeline may form part of another processing pipeline (e.g., one or more stages shared by two processing pipelines), avoiding redundant processing circuit instantiations. Moreover, as any or all of the combinatorial logic blocks may be implemented by relatively large transistor circuits and thus require sizeable die area, decomposition of processing functions into multiple stages—including varying number of stages according to domain clock frequency range—may be implemented through multiplexed signal routing rather than (or in addition to) duplicated processing circuit instances. As discussed below, multiplexed signal routing may be applied more generally to effect pipeline engagement in a selected timing domain—for example, multiplexing the clock signal for a selected domain to the flop stages of a selectable-domain processing pipeline and likewise multiplexing the inputs and outputs of that pipeline to effect engagement (placement or institution) in one timing domain or the other.

One or more processing stages within the domain-selective pipelines discussed above may generate supplemental data that propagates, together with input data to such stage (s), through subsequent pipestages (if any) to the memory-side or host-side PHY—effectively expanding the width of the pipeline from the output of that pipestage onward. An error code correction (ECC) generator implemented in one or more write-path processing stages, for example, may yield a predetermined number of ECC bytes per input data word, with both the data processed to yield the ECC bytes and the ECC bytes propagating together to the memory-side PHY for transmission to (and storage within) the memory component. Conversely, when the data+ECC is read out of memory and supplied to an error detection/correction (EDC) circuit, the resulting syndrome may be discarded (e.g., where no uncorrected errors are reported) with only the data portion of the retrieved superset propagating to the host-side PHY (i.e., for return to the host component)—effectively shrinking the data output of the EDC relative to its input. From the standpoint of domain selectivity, the input-to-output pipeline data width expansion or contraction (i.e., data forwarded from a given stage is wider or narrower than data received in that stage) means, among other things, that the width of the data passing through the domain-cross FIFO will vary according to the domain in which the processing-pipeline is engaged and thus that the effective width of the domain-cross FIFO is processing-domain-dependent.

FIG. 3 illustrates an embodiment of a domain-cross FIFO memory 210 having a domain-dependent data width—operating with either a wider or narrower data width according to whether the processing pipeline is engaged in the FIFO-load domain (clkA domain in this write-path example) or FIFO-unload domain (destination domain or clkB domain). In the specific example shown, an ECC generator 211/213 implemented within processing stage Z produces an additional byte of output data for every four bytes of input data—in this case generating 8 bytes (8B) of ECC data in response 32 bytes (32B) of input data and thus expanding the width of the data supplied to downstream circuitry to 40 bytes (40B). Accordingly, when the processing pipeline is engaged in the host-side domain (clkA domain), ECC-supplemented 40B data values from pipestage 215 enter the domain-cross FIFO in successive clkA cycles (and emerge in successive clkB cycles), whereas the narrower 32B data-in values (ECC not yet generated) enter and emerge from the domain-cross FIFO when the processing pipeline is engaged in the memory-side clock domain (i.e., with data expansion occurring within pipestage 217, downstream of the domain-cross FIFO).

In the FIG. 3 embodiment, DX FIFO memory 210 is implemented by respective 32B-wide and 8B-wide storage blocks 221, 223 (e.g., static random access memory (SRAM) storage elements), the former to store 32B data values regardless of processing pipeline disposition and the latter to store 8B ECC values only when the processing pipeline is engaged in the load-side (host-side) timing domain. In the depicted example, FIFO input multiplexer 225 passes 40B data values from either ECC generator 211 (e.g., implementing part or all of processing stage Z and possibly multiple processing stages) or 32B data values from the data input (i.e., input to the processing pipeline), in the latter case supplementing the 32B data values with 8B of null data (e.g., grounded as shown or pulled-high). When the host-side processing-pipeline is engaged, ECC storage block 223 is enabled (e.g., via dmA assertion at enable input "en") and thus stores the incoming 8B ECC value for downstream readout while the data storage memory 221 stores the corresponding 32B data value (e.g., the same write and read pointers being applied to both storage blocks 221 and 223. Conversely, when the host-side processing pipeline is bypassed (i.e., dmA=0, engaging instead the memory-side processing pipeline), ECC storage 223 is disabled (storing no data in response to load-signal assertion, and outputting during readout, for example, a grounded or pulled-up 8B value) so that only the 32B data-in value is stored within and readout from FIFO memory 210 (i.e., within/from storage block 221). In that case (memory-side pipeline engaged), the 32B FIFO output is supplied to the memory-side processing pipeline, expanding to 40B (32B data, 8B ECC) at ECC pipestage(s) 217. Output multiplexer thus selects either the 40B output of the memory-side processing pipeline or the 40B FIFO output (the FIFO output constituting the 40B host-side processing pipeline output re-timed into the memory-side domain) according to the domain-select signal, in either case passing 32B data and 8B ECC to the memory-side PHY. In alternative embodiments, the FIFO input multiplexer may be implemented as a 32B structure (as only the 32B data value need be alternately selected from host-side processing pipeline or host-side data input) with any host-side-generated ECC values being selectively stored according to the domain-select signal state. Also, the separate data and ECC storage memories 221, 223 may be implemented by a unified memory (e.g., simply storing the null-valued ECC bytes where the host-side processing pipeline is bypassed). Further, various additional data expansion or contraction operations may be carried out deterministically or conditionally within the processing pipeline (in some cases effected dynamically in response to changing system conditions and/or information conveyed in the propagating data itself), with corresponding additional data-width scaling circuitry and domain-cross FIFO width-configurability.

Figure 4:
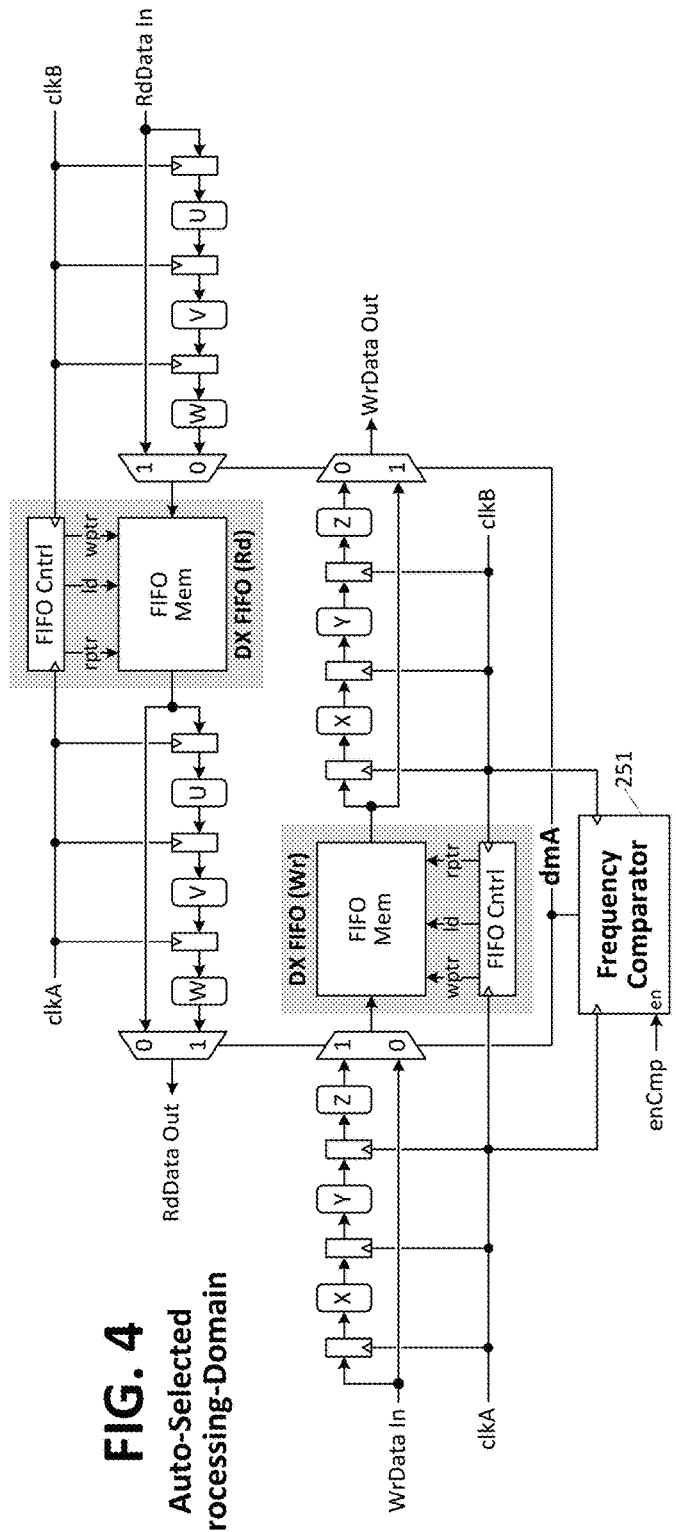
FIG. 4 illustrates exemplary domain-crossing circuitry and domain-selective processing pipelines controlled by a frequency-comparator-generated domain-select signal.

FIG. 4 illustrates exemplary domain-crossing circuitry and domain-selective processing pipelines controlled by a frequency-comparator-generated domain-select signal. In the depicted implementation, frequency comparator 251 compares the frequencies of domain-clocks A and B in response to compare-enable signal assertion (e.g., a signal, shown in FIG. 4 as enCmp, that may be asserted once during system startup and occasionally thereafter—for example, in response to events indicating possible frequency drop in either the host-side of memory-side clock domains, or in response to a soft-reset or power-loss indication). In one implementation, frequency comparator 251 includes a pair of domain-clock counters that are incremented in response to rising and/or falling edges of the A and B clocks, respectively, with the first counter to reach a given threshold (or terminal count, etc.) signaling its clock source as the higher frequency clock (a race to the finish-count). Alternatively the two counters may be operated for a predetermined time (e.g., so long as the enCmp signal is asserted) and thereafter compared to see which counted more clock cycles (with the clock source of the higher count identified as the higher frequency clock). More generally, any practicable frequency-compare technique or other manner of identifying the higher frequency of two clocks may be implemented within or instead of frequency comparator 251. Also, upon ascertaining the relative or absolute frequencies of the two domain clocks, frequency comparator 251 may use that frequency information together with other information (e.g., relative time periods required for processing operations, etc.) to selectively raise or lower the domain-select signal—including, in some cases, engaging the processing pipeline within the lower frequency clock domain (e.g., where the alternative-domain engagement would require additional pipestages that, due to relatively slight difference between domain frequencies, would yield a higher latency processing pipeline). In yet other embodiments, a programmable register within the DS controller may include a bit-field specifying either that the frequency comparator (or other auto-domain-select circuit) is to control the domain selection or, alternatively, that a programmed domain selection (e.g., within another field of the programmable register) is to control—that is, one field within the programmable register to specify the domain-control source, and another field to specify the domain-select value, with the setting of that latter field only being applied when enabled by the setting of the former (domain-control source) field.

Still referring to FIG. 4, domain-selective processing pipelines are shown for both the data read and data write flow directions—in this example with a single domain-select signal controlling the pipeline engagement for both data flows (read and write). In alternative embodiments, separate read and write domain-select signals may be generated to control pipeline engagements for the read and write flow directions, thus enabling asymmetric pipeline engagement (i.e., before FIFO crossing in one flow direction and after FIFO crossing in the other). The pre-processing and post-processing pipelines within the read flow (i.e., pre- and post-processing referring to pipeline engagement before and after data has transited the domain-cross FIFO) are shown as implementing conceptual operations U, V, W in respective pipestages. As in the write-flow pipeline, numerous additional and/or different processing operations may be implemented within the read-flow processing pipeline, including one or more processing operations identical to those executed within the write flow, processing operations that yield data expansion or contraction (e.g., EDC as discussed above), and so forth. Also, as in the write-processing flow of FIG. 2, the pre-processing and post-processing pipelines within the read flow may be asymmetric (e.g., one or more pipestages within the host-side domain implemented by a larger number of pipestages within the memory-side domain or vice-versa).

In all domain-selective controller implementations presented herein, functional logic circuitry (e.g., combinatorial circuitry) may be engaged within alternate-domain processing pipelines via timing-signal multiplexing (and input/output multiplexing) instead of circuit replication. FIG. 5, for example, illustrates an alternative implementation of the domain-selective X-Y-Z processing pipelines of FIG. 1. As shown, a single instance of the X-Y-Z processing pipeline (271) is clocked by a selected one of the domain clocks clkA and clkB passed (i.e., as "sClk") by multiplexer 273 according to the state of domain-select signal, dmA. The processing pipeline is likewise configurably coupled, via multiplexer 275 (also controlled by the domain-select signal), between either the data input and FIFO-input multiplexer 141 or the FIFO output and data output multiplexer 145. In alternative embodiments, domain-dependent pipeline implementation (e.g., adding one or more pipestages to meet timing constraints in a faster clock domain, redistributing logic functions among pipestages, domain-dependent FIFO and pipestage data width, etc.) may additionally be supported via additional multiplexing circuits (e.g., to selectively engage expanded-width/contracted-width data paths, alternative processing function implementations/redistributions, etc.).

As discussed above, depending on relative frequencies of FIFO load and unload clock domains and FIFO read/write-pointer-synchronizer depth (i.e., number of serial synchronizer stages deployed to re-time the FIFO write and read pointers into counterpart domains and thus enable comparison between domain-aligned pointer instances to ascertain FIFO full/empty status), data written into FIFO memory may be idle for one or more cycles of the load or unload clock domains. In those scenarios, otherwise same-cycle loading of the FIFO memory and pointer synchronizing queue may be split, with the pointer inserted into the synchronizer without delay (in response to FIFO write signal assertion) while FIFO data loading is deferred for one or more otherwise idle cycles—data being loaded into FIFO memory just in time for subsequent unload. Through this arrangement, one or more clock cycles in which data is otherwise idled within FIFO memory may be allocated to the processing pipeline, shortening the data propagation latency between host-side and memory-side PHYs according to the number of otherwise idle FIFO-storage cycles reallocated to pipeline processing.

FIG. 6 illustrates an example of such hidden-cycle processing—executing, in this example, the final processing stage of processing pipeline engaged in the FIFO-load domain (e.g., the host-side domain in the write data path, or the memory-side domain in the read data path) after the write pointer for the subject data has entered an N-stage synchronizer, effectively hiding the final processing stage under the FIFO pointer synchronization time. As shown, the tightest-timing-budget alignment between the load and unload domain clocks (clkA and clkB, respectively, in this example, with $freq_{clkA}=1.25*freq_{clkB}$) occurs where a FIFO load operation is initiated within the load domain just prior to the commencement of a new clock cycle within the unload domain (i.e., rising edge of clkA just prior to rising edge of clkB in the FIG. 6 example). In that case—and assuming for purposes of illustration that data load into FIFO memory and pointer load into N-stage synchronizer are executed simultaneously—the data will reside in FIFO memory for N−1 whole cycles of the load and unload domain clocks, with the write pointer becoming valid in the unload domain during the Nth cycle of the load-domain clock, the earliest possible unload point (i.e., N−1 cycles of the unload clock concluded at the earliest possible time relative to the FIFO load point). As emphasized by the "load" and "idle" domain-cycle labeling, the first of the N−1 cycles of FIFO residence is consumed by the FIFO load operation, but the data is thereafter idle within the FIFO for (N−1)−1=N−2 cycles. Accordingly, in this three-stage synchronizer example (N=3), any data loaded at the FIFO pointer insertion point (i.e., edge of clkA at which pointer is inserted into multi-stage synchronizer) will, under tightest possible timing conditions, be idle for one whole domain clock cycle and at least a fraction portion of a subsequent domain clock cycle. In a number of embodiments herein, that otherwise idle clock cycle of the load domain is leveraged to execute a portion of a load-domain processing pipeline—inserting the write pointer into the synchronizer on time, but deferring data load into FIFO memory until necessary to meet unload timing requirements. An example of such deferred FIFO load (allocating to the load domain processing pipeline one or more domain clock cycles in which data would otherwise be idle within FIFO memory) is presented at 291, showing the net reduction in processing pipeline latency from $t_{LAT1}$ (data idle in the FIFO) to $t_{LAT2}$ (data processing hidden under pointer synchronization time). In the more general case, where M is the frequency ratio between the load and unload domains (e.g., $M=freq_{clkA}/freq_{clkB}$ in the write data flow), the total number deferred-load cycles (i.e., where data would otherwise be idle in the FIFO) is $DC=M*(N-1)-1$ (where '*' denotes multiplication and DC is rounded down to nearest integer). Thus, where the clkA/clkB frequency ratio increases from 1.25 to 1.875 (e.g., 1.5 GHz host-side clock, 800 MHz memory-side clock) and the synchronizer depth (N) remains at three, the deferred-load cycle count DC increases to two (i.e., int[1.875*2]−1]), such that two load-domain clock cycles that transpire during pointer synchronization time may be leveraged for load-domain pipeline processing. Various other clock frequency ratios and synchronizer depths may apply in alternative embodiments. Also, in at least some embodiments, where the fraction of the domain-clock cycle ($t_{CF}$) that precedes the earliest possible FIFO unload (e.g., as shown at 293 in FIG. 6) provides sufficient margin for a FIFO memory load operation requiring a time interval, $t_{LD}$ (i.e., $t_{CF}$−$t_{LD}$>tolerance), the FIFO load may be deferred by an additional cycle—deferring the FIFO load until the same cycle in which the unload occurs. As an example, in the M=1.875 example above, DC=int[3.75−1], meaning that the earliest possible unload will not occur until after 2.75 cycles of the load-domain clock have transpired—two whole load-domain clock cycles and a 75% fraction of a third load-domain clock cycle. Where, for example, $t_{load}$ consumes 50% of a load clock period, and 10% of the load clock period (for example) is required to meet FIFO-write setup, hold time and/or other tolerance requirement under worst-case process-corner, temperature and voltage conditions, it may be possible to defer the FIFO load into the final 75% fractional cycle of the load-domain clock, freeing all three of the whole load-domain clock cycles for pipeline processing and thus further reducing end-to-end pipeline latency.

FIG. 7 illustrates an embodiment of a deferred-load domain-cross FIFO 301 that enables FIFO data load to be deferred for one or more load-domain clock cycles (after write pointer insertion into an N-stage synchronizer) and thus, by allocating those additional domain clock cycles to execution of processing pipeline operations, hiding one or more processing pipeline stages under the FIFO pointer synchronization time. In the depicted example, deferred-load DX FIFO 301 includes a FIFO memory 303 and FIFO controller 305, the latter including write and read state machines (307, 309), a counter-flowing pair of pointer synchronizers 311, 313 (one for conveyance of a write pointer (wptr) into the unload clock domain, the other to convey the read pointer (rptr) to the load clock domain), and load-delay selector 315. In one embodiment, write state machine 307 receives a deferred-cycle value (DC) and domain-select value (dmA) (e.g., from programmable register 310 although either or both of those values may alternatively be auto-generated), with the deferred-cycle value indicating a clock-cycle offset between assertion of the FIFO write signal ("write") and actual data load into FIFO memory 303—that is, the number of clock cycles (which may be zero) for which FIFO data load is to be deferred to enable continued pipeline processing while awaiting write-pointer synchronization within the unload domain (i.e., leveraging time that pipeline output data would otherwise be idle in FIFO memory 303).

In the FIG. 7 implementation, write state machine 307 outputs a multi-bit defer-control signal (δ) according to the DC and dmA settings, matching the DC value if dmA specifies pipeline engagement in the FIFO-load domain, and zero-valued if dmA specifies pipeline engagement in the FIFO-unload domain. Per the example in FIG. 6, DC (and thus the defer-control signal, δ) may range from 0 to N−1 and thus be 0, 1 or 2 in this 3-stage synchronizer example (i.e., each of synchronizers 311 and 313 includes N=3 flop stages). The defer-control signal is supplied to load-delay circuit 315 and also to control circuitry within or associated with the processing pipeline (not specifically shown in the FIG. 7 example) to control write signal assertion timing, in effect establishing the number of pipelined operations to be executed while the write pointer propagates through synchronizer 311. That is, where δ=2, the write signal is asserted prior to commencement of the Y and Z processing operations (procY, procZ) so that write pointer propagates through synchronizer 311 while the Y, Z processing operations are executed, effectively hiding those operations within the FIFO delay time. Where δ=1, the write signal is asserted one cycle later, prior to commencement of procZ, hiding that processing operation under the FIFO pointer synchronization time. Where δ=0, the write signal is asserted after data has propagated through the processing pipeline (emerging from final stage) or, where the load-domain pipeline is bypassed, when data from the inbound interface (data in) becomes valid at the FIFO input.

Still referring to FIG. 7, write state machine 307 responds to write signal assertion by outputting a write pointer (e.g., advancing the pointer if not auto-advanced after prior load operation) and load-enable signal (shown respectively as "wptr," and "ld") to load-delay circuit 315 and synchronizer 311 (read state machine 309 executes a converse operation in response to read signal assertion, outputting a read pointer (rptr) to synchronizer 313 and a read address (rAd) to the FIFO memory, the latter being, for example, the read pointer itself, a value related to the read pointer, etc.). In one embodiment, shown in detail view 320, the write pointer and load signal (e.g., the latter being a high or low logic value and thus, in effect, a bit) propagate through respective sequences of flop stages (323, 325) to produce single-cycle-delayed and two-cycle-delayed load-enable instances of those signals, with those cycle-delayed signals and the original un-delayed signal instances selectively output (via multiplexers 327 and 329) as a write address (wAd) and delayed-load-enable (dld) according to the defer-control value. Thus, when δ=2, the load pulse and write pointer are delayed by two cycles (relative to write signal assertion) before being output to FIFO memory 303, triggering a two-cycle-deferred FIFO data load that provides time for execution of two pipelined processing operations (Y and Z pipestages)—hiding those pipelined processing operations under FIFO write-pointer synchronization time. Similarly, when δ=1, the load pulse and write pointer are delayed by one cycle before being output to FIFO memory 303, triggering a cycle-deferred FIFO data load that enables pointer-sync-time execution of the Z processing operation. When δ=0, the non-delayed load pulse and write pointer output to the FIFO memory to effect concurrent FIFO loading and pointer insertion (no hidden-cycle processing).

Deferred-load operation of the domain-cross FIFO may be implemented with various different architectures in alternative embodiments (e.g., rSM outputting read pointer as read address rather than separate signals and, conversely, write pointer supplied to synchronizer 311 may be pre-advanced relative to write address supplied to load-delay circuit 315, depths of synchronizers (and thus flop-stage sequences 323, 325) may be increased or decreased relative to those shown and so forth. More generally, any practicable domain-crossing circuitry may be deployed within the various domain-selective control components presented herein, with pipelined data processing hidden under any requisite inter-domain synchronization time.

The various systems, system IC components, domain-selective controller architectures, circuit implementations, etc. disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit, layout, and architectural expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits and device architectures can be processed by a processing entity (e.g., one or more processors) within the computer system in conjunction with execution of one or more other computer programs including, without limitation, net-list generation programs, place and route programs and the like, to generate a representation or image of a physical manifestation of such circuits and architectures. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply details not required to practice those embodiments. For example, any of the specific quantities/types of signal polarities, clock frequencies, data widths, processing pipelines (number of stages, functions implemented, etc.), domain-cross FIFO implementations (including depth of any pointer synchronizing circuits or other inter-domain synchronizing circuits therein), communication protocols, PHY implementations, and the like can be different from those described above in alternative embodiments. Signal paths depicted or described as individual signal lines may instead be implemented by multi-conductor signal buses and vice-versa and may include multiple conductors per conveyed signal (e.g., differential or pseudo-differential signaling). The term "coupled" is used herein to express a direct connection as well as a connection through one or more intervening functional components or structures. Programming of operational parameters (e.g., domain-select value, number of clock cycles for which FIFO-load is deferred, auto domain-select enable, domain-frequency ratio, etc.) or any other configurable parameters may be achieved, for example and without limitation, by loading a control value into a register or other storage circuit within above-described integrated circuit devices in response to a host instruction and/or on-board processor or controller (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated-circuit component comprising:
   first and second signaling interfaces operating in first and second timing domains, respectively, the first signaling interface to receive data; and
   data propagation circuitry to:
   forward the data to the second signaling interface such that the data crosses from the first timing domain to the second timing domain; and
   execute one or more processing operations with respect to the data in the first timing domain if a domain-select signal is in a first state and in the second timing domain instead of the first timing domain if the domain-select signal is in a second state.

2. The integrated-circuit component of claim 1 wherein the data propagation circuitry to forward the data to the second signaling interface comprises sequence of processing stages through which the data is shifted to perform the one or more processing operations.

3. The integrated-circuit component of claim 2 wherein the first signaling interface to receive the data comprises circuitry to receive data having a first width, and wherein the sequence of processing stages through which the data is shifted to perform the one or more processing operations comprises circuitry to:
   output, from one or more processing stages in the sequence of processing stages, data having a second width different from the first width such that data having a second width propagates to the second signaling interface; and
   modify data within one or more of the processing stages in the sequence of processing stages such that data propagating to the second signaling interface is modified relative to the data received via the first signaling interface.

4. The integrated-circuit component of claim 2 wherein the sequence of processing stages through which the data is shifted to perform the one or more processing operations comprises a first sequence of processing stages through which the data is shifted before crossing from the first timing domain to the second timing domain if the domain-select signal is in the first state, and a second sequence of processing stages through which the data is shifted after crossing from the first timing domain to the second timing domain if the domain-select signal is in the second state.

5. The integrated-circuit component of claim 4 wherein the first sequence of processing stages includes at least one processing stage also included in the second sequence of processing stages.

6. The integrated-circuit component of claim 4 wherein the first and second sequences of processing stages comprise disparate quantities of processing stages.

7. The integrated-circuit component of claim 1 wherein the data propagation circuitry to execute the one or more processing operations with respect to the data in the first timing domain if the domain-select signal is in the first state and in the second timing domain instead of the first timing domain if the domain-select signal is in the second state comprises circuitry to conduct either a first clock signal or a second clock signal to clock inputs of the processing stages according to whether the domain-select signal is in the first state or the second state, the first clock signal corresponding to the first timing domain and the second clock signal corresponding to the second timing domain.

8. The integrated-circuit component of claim 1 wherein the first and second timing domains are defined by first and second clock signals having disparate frequencies.

9. The integrated-circuit component of claim 8 further comprising circuitry to determine which of the first and second clock signals oscillates at higher frequency than the other, and to generate the domain-select signal in either the first state or the second state based at least in part which of the first and second clock signals is determined to oscillate at higher frequency than the other.

10. The integrated-circuit component of claim 1 wherein the data propagation circuitry to forward the data to the second signaling interface operating in the second timing domain such that the data crosses from the first timing domain to the second timing domain comprises a first-in-first-out (FIFO) data storage structure to store the data and then output the data to effect a crossing of the data from the first timing domain to the second timing domain, the FIFO data storage structure having circuitry to synchronize write and read pointers therein, and wherein the data propagation circuitry to execute the one or more processing operations with respect to the data comprises circuitry to execute at least one of the one or more processing operations after commencing synchronization of a read or write pointer corresponding to the data.

11. A method of operation within an integrated-circuit component, the method comprising:
  receiving data via a first signaling interface operating in a first timing domain;
  forwarding the data to a second signaling interface operating in a second timing domain such that the data crosses from the first timing domain to the second timing domain; and
  executing one or more processing operations with respect to the data in either the first timing domain if a domain-select signal is in a first state and in the second timing domain instead of the first timing domain if the domain-select signal is in a second state.

12. The method of claim 11 wherein forwarding the data to the second signaling interface comprises shifting the data through a sequence of processing stages that perform the one or more processing operations.

13. The method of claim 12 wherein receiving data via the first signaling interface comprises receiving data having a first width, and wherein shifting the data through the sequence of processing stages that perform the one or more processing operations comprises:
  outputting, from one or more processing stages in the sequence of processing stages, data having a second width different from the first width such that data having a second width propagates to the second signaling interface; and
  modifying data within one or more of the processing stages in the sequence of processing stages such that data propagating to the second signaling interface is modified relative to the data received via the first signaling interface.

14. The method of claim 12 wherein shifting the data through a sequence of processing stages that perform the one or more processing operations comprises shifting the data through a first sequence of processing stages before crossing from the first timing domain to the second timing domain if the domain-select signal is in the first state, and shifting the data through a second sequence of processing stages after crossing from the first timing domain to the second timing domain if the domain-select signal is in the second state.

15. The method of claim 14 wherein the first sequence of processing stages includes at least one processing stage also included in the second sequence of processing stages.

16. The method of claim 14 wherein the first and second sequences of processing stages comprise disparate quantities of processing stages.

17. The method of claim 11 wherein executing the one or more processing operations with respect to the data in the first timing domain if the domain-select signal is in the first state and in the second timing domain instead of the first timing domain if the domain-select signal is in the second state comprises clocking the processing stages with either a first clock signal or a second clock signal according to whether the domain-select signal is in the first state or the second state, the first clock signal corresponding to the first timing domain and the second clock signal corresponding to the second timing domain.

18. The method of claim 11 wherein the first and second timing domains are defined by first and second clock signals having disparate frequencies.

19. The method of claim 18 further comprising:
  determining which of the first and second clock signals oscillates at higher frequency than the other; and
  generating the domain-select signal in either the first state or the second state based at least in part which of the first and second clock signals is determined to oscillate at higher frequency than the other.

20. The method of claim 11 wherein receiving data via the first signaling interface comprises receiving from a host integrated-circuit component together with an instruction to store the data within integrated-circuit memory coupled to the second interface.

21. The method of claim 11 wherein forwarding the data to the second signaling interface operating in the second timing domain such that the data crosses from the first timing domain to the second timing domain comprises synchronizing write and read pointers within a first-in-first-out data storage structure in which the data is stored and then read out to cross from the first timing domain to the second timing domain, and wherein executing the one or more processing operations with respect to the data comprises executing at least one of the one or more processing operations after commencing synchronization of a read or write pointer corresponding to the data.

22. An integrated-circuit component comprising:
  a first and second signaling interfaces operating in first and second timing domains,
    respectively, the first signaling interface to receive data; and
  means for:
    forwarding the data to the second signaling interface such that the data crosses from the first timing domain to the second timing domain; and
    executing one or more processing operations with respect to the data in the first timing domain if a domain-select signal is in a first state and in the second timing domain instead of the first timing domain if the domain-select signal is in a second state.

\* \* \* \* \*